(12) United States Patent
Pagel

(10) Patent No.: US 7,352,509 B2
(45) Date of Patent: Apr. 1, 2008

(54) METHOD AND APPARATUS ATTENUATING DIRECT SUN LIGHT WHILE PROVIDING A VIEW OF THE SKY THROUGH A LIGHT TUNNEL IN A SKYLIGHT SYSTEM

(76) Inventor: Dan Pagel, 1268 McFar La., Hayward, CA (US) 94544

( * ) Notice: Subject to any disclaimer, the term of this patent is extended or adjusted under 35 U.S.C. 154(b) by 607 days.

(21) Appl. No.: 10/441,608

(22) Filed: May 20, 2003

(65) Prior Publication Data

US 2004/0231715 A1   Nov. 25, 2004

(51) Int. Cl.
   *G02B 27/00*   (2006.01)
   *H01L 31/042*   (2006.01)
   *E04D 13/18*   (2006.01)
(52) U.S. Cl. .................. 359/596; 136/251; 52/173.3
(58) Field of Classification Search ............... 359/594, 359/596; 52/173.3, 72, 200; 136/251
   See application file for complete search history.

(56) References Cited

U.S. PATENT DOCUMENTS

| | | | |
|---|---|---|---|
| 3,709,583 A | 1/1973 | Pfannkuch et al. | |
| 4,203,426 A | 5/1980 | Matlock et al. | |
| 4,297,000 A | 10/1981 | Fries | |
| 4,306,769 A | 12/1981 | Martinet | |
| 4,883,340 A * | 11/1989 | Dominguez | 359/593 |
| 5,493,824 A | 2/1996 | Webster et al. | |
| 5,517,358 A | 5/1996 | Dominguez | |
| 5,878,539 A | 3/1999 | Grubb | |
| 6,178,707 B1 | 1/2001 | Bengtson | |
| 6,433,932 B1 * | 8/2002 | Aoki et al. | 359/597 |
| 2004/0100698 A1 * | 5/2004 | Aoki et al. | 359/591 |

* cited by examiner

*Primary Examiner*—Alex Noguerola
(74) *Attorney, Agent, or Firm*—GSS Law Group

(57) ABSTRACT

An array of preferably at least three double-sided reflective panels mounted on a rigid frame pivoting at a mounting angle to create a double-sided reflective panel array. A tracking system positioning the rigid frame at a frame angle, with respect to the direct sun light, and with respect to pivoting at the mounting angle, to create a rigid frame position. The double-sided reflective panel array interacting with the direct sunlight based upon the rigid frame position to create the direct sun light attenuation. The sky viewed through the rigid frame mounted, double-sided reflective panel array and through the light tunnel creates the sky view.

11 Claims, 6 Drawing Sheets

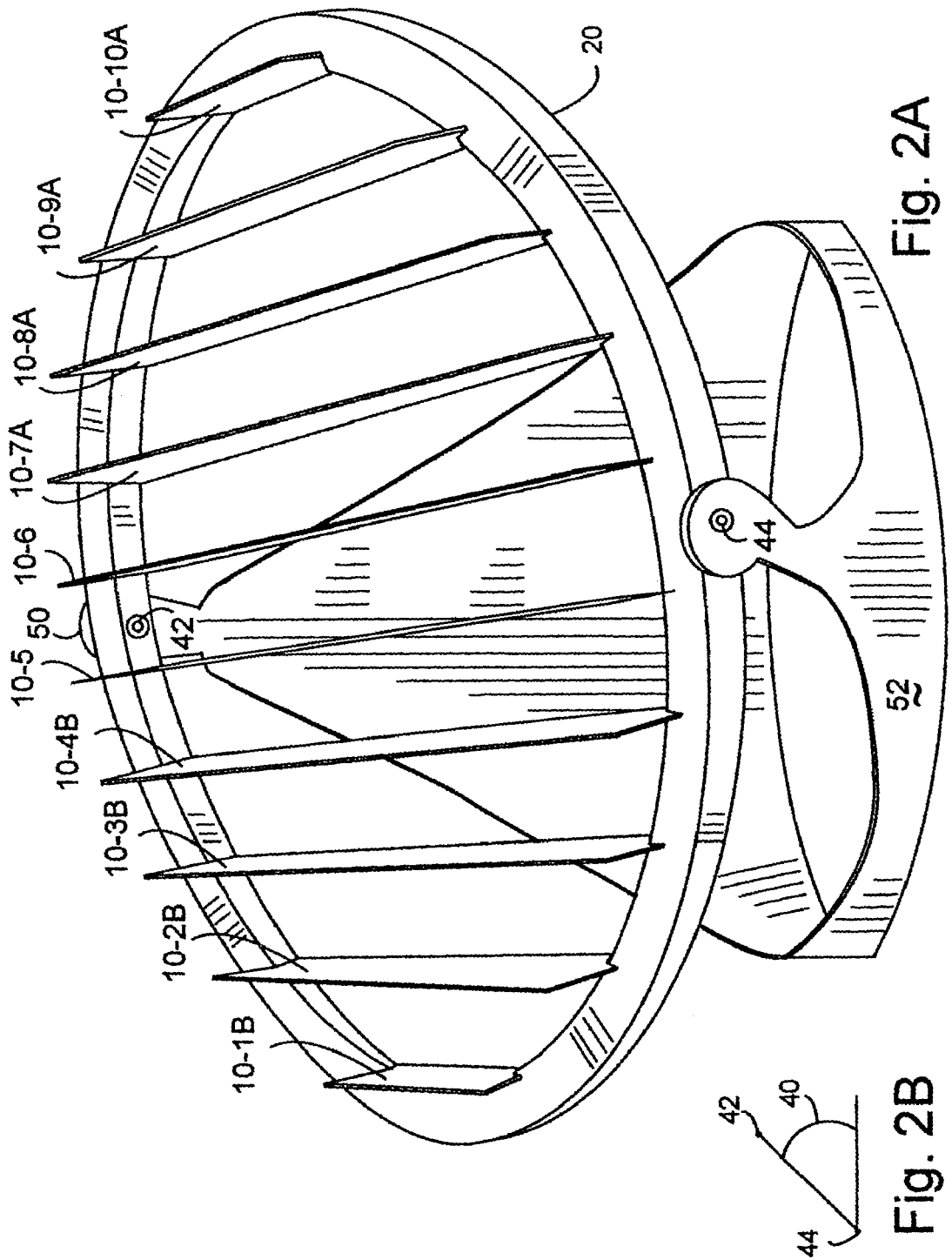

METHOD AND APPARATUS ATTENUATING DIRECT SUN LIGHT WHILE PROVIDING A VIEW OF THE SKY THROUGH A LIGHT TUNNEL IN A SKYLIGHT SYSTEM

TECHNICAL FIELD

This invention relates to control of lighting through a skylight.

BACKGROUND ART

Skylights are well known and commonly used mechanisms increasing the lighting within buildings. A skylight includes a light tunnel connecting the interior of a building to the exterior, and some mechanism to control and/or direct sun light through the light tunnel to the interior. Controlling direct sun light through the light tunnel often comes from a need to either maximize or minimize the intensity of direct sun light in the interior.

As used herein a mechanism directing sun light with respect to a light tunnel to either minimize or maximize the direct sun light in the interior will be referred to as an attenuating mechanism.

There are some problems with existing skylight attenuating mechanisms. These mechanisms tend to degrade or eliminate a clear view of the sky. One well-known way to minimize direct sun light is to use translucent film as a direct light barrier. Such a barrier also removes any clarity in seeing the sky itself. Such mechanisms do not allow people the pleasure of directly viewing the sky.

Other attenuating mechanisms tend to require complex tracking systems, lest they become very inefficient. The inventor has discovered that tendency toward inefficiency is due in part to the use of one sided reflective panels. These one sided reflective panels must be directly aligned to the sun to have their desired effect.

An example of the prior art is found in U.S. Pat. No. 5,493,824 entitled "Rotatably Mounted Skylight having Reflectors" by Webster, et. al. The '824 invention requires two tracking systems, one for the housing and one for the panel of reflectors. Additionally, depending on the angle of the reflective panels with respect to the sun, there may be little or no view of the sky, because the reflective panels essentially block the view in maximizing the directed sun light as in FIG. 6 of the '824 patent.

SUMMARY OF THE INVENTION

The invention includes an apparatus attenuating direct light from the sun at a location in the sky into a light tunnel in a sky light to create a direct sun light attenuation through the sky light and to create a sky view through the sky light.

The apparatus includes the following. An array of preferably at least three double-sided reflective panels mounted on a rigid frame pivoting at a mounting angle to create a double-sided reflective panel array. A tracking system positioning the rigid frame at a frame angle, with respect to the direct sun light, and with respect to pivoting at the mounting angle, to create a rigid frame position. The double-sided reflective panel array interacting with the direct sunlight based upon the rigid frame position to create the direct sun light attenuation. The sky viewed through the rigid frame mounted, double-sided reflective panel array and through the light tunnel creates the sky view.

The tracking system can optimally control the double-sided reflective panel array by positioning the array at the frame angle. There is no need for mechanical control of a second degree of motion, due to the use of double-sided reflective panels.

The sky can always be viewed through the invention, irrespective of whether the invention is maximizing or minimizing direct sun light.

The invention operates by performing the following steps. Viewing the sky through an array of N double-sided reflective panels mounted on a rigid frame at a mounting angle and through the light tunnel to create the sky view. And the double-sided reflective panel array interacting with the direct sunlight based upon the rigid frame position to create the direct sun light attenuation. N is at least one, preferably at least three.

The double-sided reflective panel array interacting with the direct sunlight includes at least one of the following. The double-sided reflective panel array reflectively directing the direct sunlight into the light tunnel to create at least part of the direct sun light attenuation. The double-sided reflective panel array reflectively directing the direct sunlight away from the light tunnel to create at least part of the direct sun light attenuation. And the double-sided reflective panel array passing the direct sunlight into the light tunnel to create at least part of the direct sun light attenuation.

These and other advantages of the present invention will become apparent upon reading the following detailed descriptions and studying the various figures of the drawings.

BRIEF DESCRIPTION OF THE DRAWINGS

FIGS. 2A and 2B illustrate an embodiment of the invention with a double-sided reflective array of ten double-sided reflective panels 10-1 to 10-10, mounted on rigid frame 20 at a first frame position;

DETAILED DESCRIPTION OF THE INVENTION

Figure 1A:
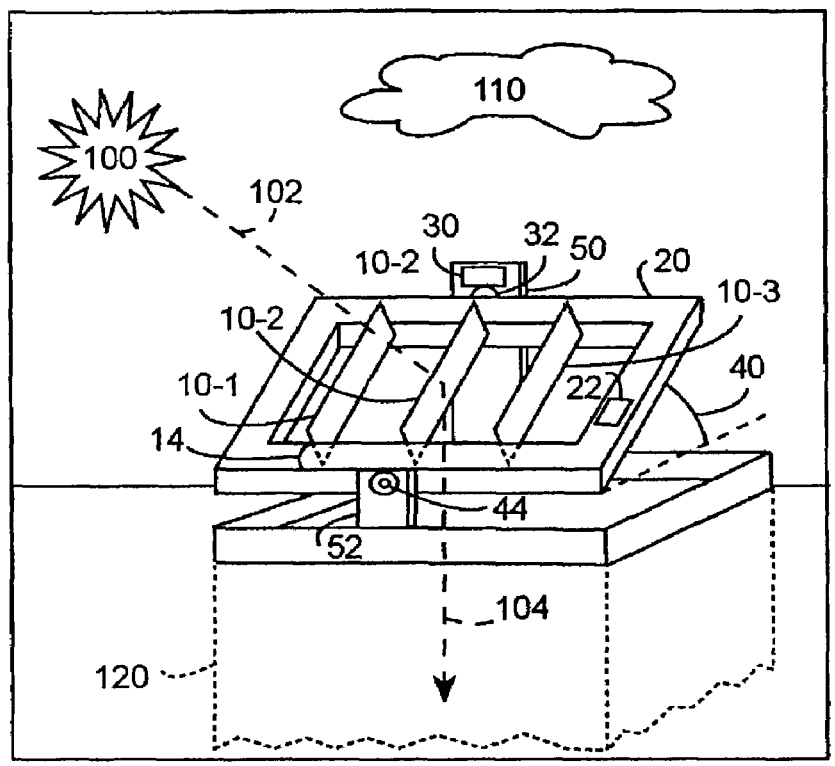
FIG. 1A illustrates an embodiment of the invention including a double-sided reflective panel array on rigid frame 20 positioned by tracking system 30, interacting with direct sunlight 102 to create the direct sunlight attenuation 104, as well as providing a view of the sky 110.

The invention includes an apparatus attenuating direct light 102 from the sun 100 at a location in the sky into a light tunnel 120 in a sky light to create a direct sun light attenuation 104 through the sky light and to create a sky view 112 through the sky light. This is illustrated in FIGS. 1A to 3.

FIG. 1A illustrates an embodiment of the invention including a double-sided reflective panel array on rigid frame 20 positioned by tracking system 30, interacting with direct sunlight 102 to create the direct sunlight attenuation 104, as well as providing a view of the sky 110.

Figure 1B:
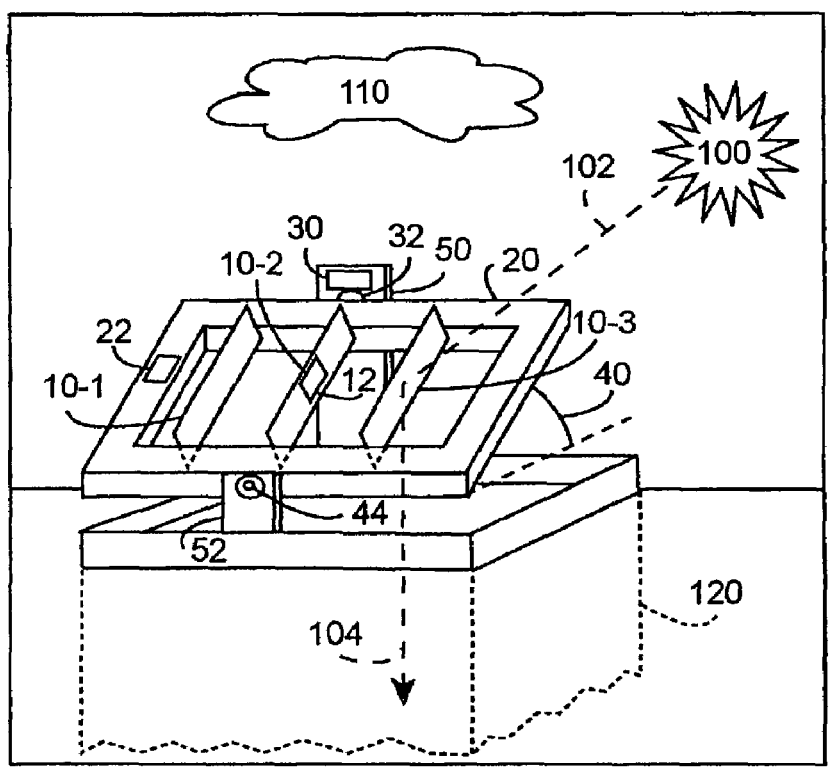
FIG. 1B illustrates the embodiment of FIG. 1A interacting with direct sunlight at a different time of day, as well as, double-sided reflective panel 10-3 further including solar cell 12.

FIG. 1B illustrates the embodiment of FIG. 1A interacting with direct sunlight at a different time of day, as well as, double-sided reflective panel 10-2 further including solar cell 12.

Figure 1C:
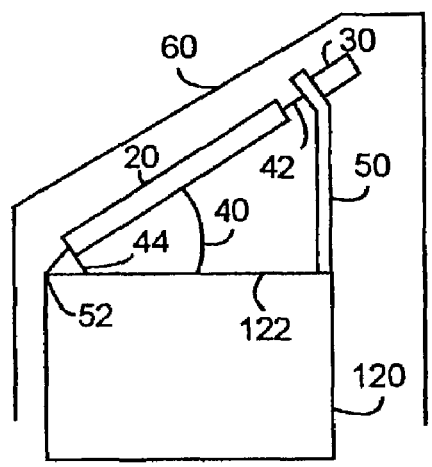
FIG. 1C illustrates a side view of the embodiment of FIGS. 1A and 1B, enclosed in an envelope 50.

FIG. 1C illustrates a side view of the embodiment of FIGS. 1A and 1B, enclosed in an envelope 60.

Figure 1D:
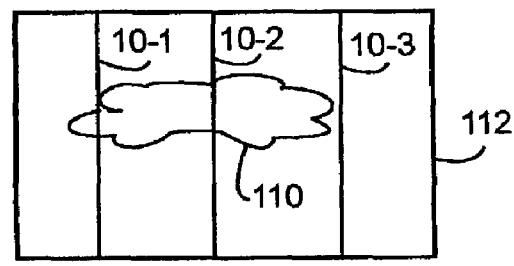
FIG. 1D illustrates the sky 110 viewed through rigid frame 20 mounted, double-sided reflective panel array 10-1 to 10-3, and through light tunnel 120, as illustrated in FIGS. 1A to 1C, and 1F, creating sky view 112.

FIG. 1D illustrates the sky 110 viewed through rigid frame 20 mounted, double-sided reflective panel array 10-1 to 10-3, and through light tunnel 120, as illustrated in FIGS. 1A to 1C, and 1F, creating sky view 112.

Figure 1E:
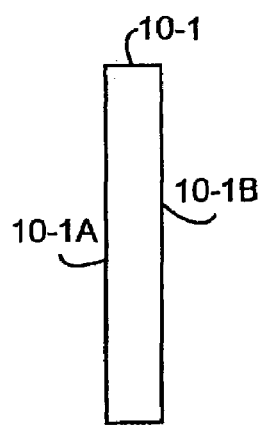
FIG. 1E illustrates a side view of a double-sided reflective panel 10-1 as illustrated in FIGS. 1A, 1B, and 1D, with reflective sides 10-1A and 10-1B.

FIG. 1E illustrates a side view of a double-sided reflective panel 10-1 as illustrated in FIGS. 1A, 1B, and 1D, with reflective sides 10-1A and 10-1B.

Figure 1F:
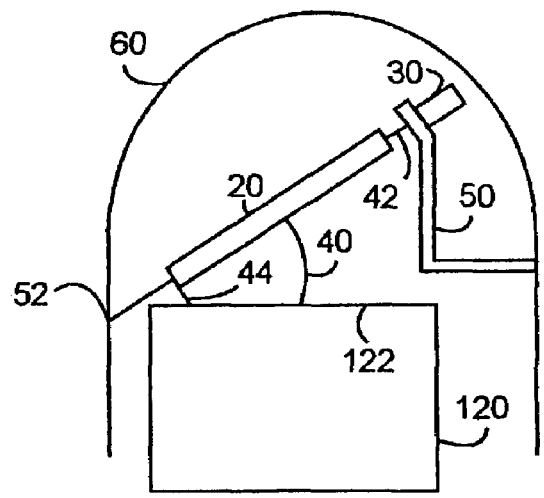
FIG. 1F illustrates a side view of the embodiment of FIGS. 1A and 1B, enclosed in a done-shaped envelope 60.

FIG. 1F illustrates a side view of the embodiment of FIGS. 1A and 1B, enclosed in a done-shaped envelope 60.

FIG. 2A illustrates an embodiment of the invention with a double-sided reflective array of ten double-sided reflective panels 10-1 to 10-10, mounted on rigid frame 20 at a first frame position.

FIG. 2B illustrates the mounting angle 40 formed as the angle between the horizontal with respect to pivots 42 and 44 of FIG. 2A.

Figures 3A, 3B:
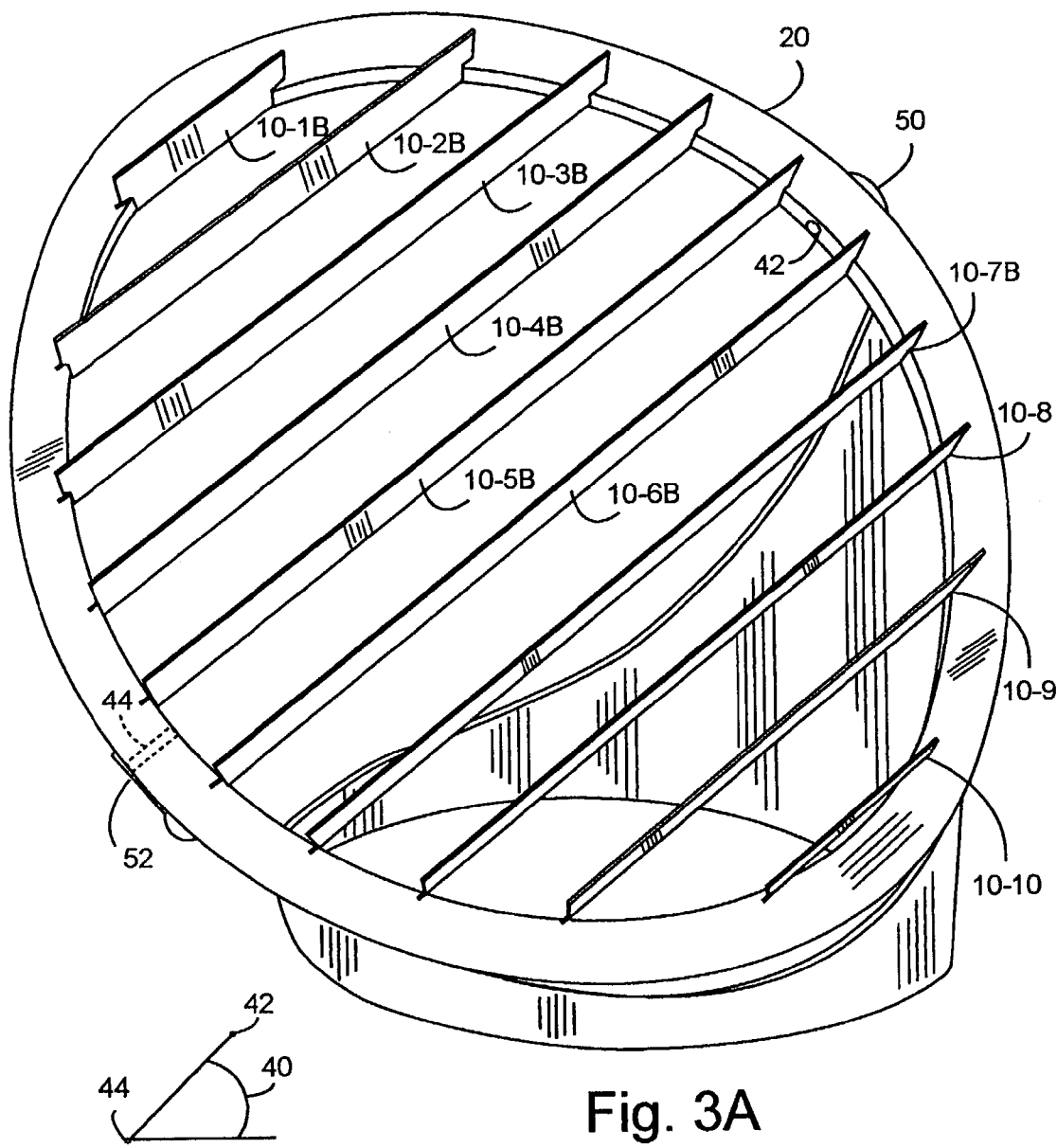
FIGS. 3A and 3B illustrate the embodiment of FIG. 2 at a second frame position.

FIG. 3A illustrates the embodiment of FIG. 2A at a second frame position.

FIG. 3B illustrates the mounting angle 40 formed as the angle between the horizontal with respect to pivots 42 and 44 of FIG. 3A.

As used herein, an array of preferably at least three double-sided reflective panels mounted on a rigid frame pivoting at a mounting angle creates a double-sided reflective panel array. A double-sided reflective panel array may have as few as one double-sided reflective panels.

In FIGS. 1A and 1B, three double-sided reflective panels, 10-1 to 10-3, mounted on a rectangular rigid frame 20 and pivoting through pivots 42 and 44, at mounting angle 40, create the double-sided reflective panel array.

In FIGS. 2A and 3A, ten double-sided reflective panels, 10-1 to 10-10, mounted on a non-rectangular rigid frame 20 and pivoting through pivots 42 and 44, as illustrated in FIGS. 2B and 3B, respectively, at mounting angle 40, create the double-sided reflective panel array.

As illustrated in FIGS. 1A to 1B, tracking system 30 positions rigid frame 20 at a frame angle 32, with respect to direct sun light 102, and with respect to pivoting at mounting angle 40, to create the rigid frame position. FIGS. 2A and 3A illustrate two distinct rigid frame positions.

FIGS. 1A and 1B illustrate tracking system 30 optimally controlling the double-sided reflective panel array 10-1 to 10-3, by positioning the array at the frame angle 32. There is no need for mechanical control of a second degree of motion, due to the use of double-sided reflective panels and pivoting about the mounting angle 40.

In FIGS. 1A and 1B, double-sided reflective panel array, 10-1 to 10-3, interacts with direct sunlight 102 based upon rigid frame position to create the direct sun light attenuation 104.

In FIGS. 1A and 1B, the sky 110 viewed through the rigid frame 20 mounted, double-sided reflective panel array, 10-1 to 10-3, and through light tunnel 120 creates sky view 112, as illustrated in FIG. 1D. The sky 110 can always be viewed through the invention, irrespective of whether the invention is maximizing or minimizing direct sun light 102.

Note that the view of the sky 110 is schematically represented as a cloud in FIGS. 1A, 1B, and 1D.

In FIGS. 1A, 1B, 2A, and 3A, double-sided reflective panel arrays interact with direct sunlight in several ways.

In FIGS. 1A and 1B, the double-sided reflective panel array reflectively directs direct sunlight 102 into light tunnel 120 to create direct sun light attenuation 104, by use of panel 10-2 and 10-3, respectively.

In FIGS. 2A and 3A, assume that the perspective is that of looking at the double-sided reflective panel array as the direct sun light 102.

In FIG. 2A, the double-sided reflective panel array passes direct sunlight 102 into light tunnel (not shown) to create direct sun light attenuation as seen by the head-on view of panels 10-5 and 10-6.

In FIG. 2A, the double-sided reflective panel array reflectively directs direct sunlight 102 into light tunnel (not shown) to create direct sun light attenuation 104, by panel sides 10-1B to 10-4B and 10-7A to 10-10A.

In FIG. 3A, the double-sided reflective panel array reflectively directs direct sunlight away from the light tunnel (not shown) to create the direct sun light attenuation, by panel sides 10-1B to 10-7B.

In FIG. 3A, the double-sided reflective panel array passes direct sunlight 102 into light tunnel (not shown) to create direct sun light attenuation as seen by the head-on view of panels 10-8 to 10-10.

In FIGS. 1A and 1B, tracking system 30 positions rigid frame 20 to create direct sun light attenuation 104 through the sky light based upon sun location 100 in the sky.

The solar cell 12 of FIG. 1B may provide electrical power to tracking system 30.

In FIGS. 1A and 1B, rigid frame 20 approximately covers light tunnel 120 with respect to mounting angle 40. Further, rigid frame 20 approximates the shape of light tunnel 120 projected at mounting angle 40. The rigid frame 20 approximates a polygon projected at mounting angle 40 when the light tunnel 120 shape approximates that polygon.

In FIGS. 2A and 3A, rigid frame 20 approximates a circle projected at mounting angle 40, illustrated in FIGS. 2B and 3B, respectively, whenever the light tunnel shape approximates that circle. Alternatively, rigid frame 20 approximates an oval projected at mounting angle 40 whenever the light tunnel shape approximates that oval.

In FIGS. 1C, 1F, 2A, and 3A, rigid frame 20 pivotably attaches to mounting infrastructure 50 and 52 at pivots 42 and 44, respectively.

In FIGS. 1A to 1C, and 1F, rigid frame 20 mounts to a mounting infrastructure 50-52 at mounting angle 40 with respect to light tunnel 120.

In FIGS. 1A to 1C, mounting infrastructure 50-52 is rigidly coupled to light tunnel 120.

In FIG. 1F, mounting infrastructure 50-52 is rigidly coupled to envelope 60.

In FIGS. 1A, 1B, 2A, and 3A, the mounting infrastructure 50-52 shape increases sun light access into a light tunnel.

In FIG. 1C, the mounting infrastructure 50-52 shape decreases sun light access into light tunnel 120, when mount 50 covers nearly the length of rigid frame 20.

In FIGS. 1C and 1F, envelope 60 encloses rigid frame 20 and supports sky view 112 of FIG. 1D created through rigid frame 20 mounted, double-sided reflective panel array, 10-1 to 10-3, and through light tunnel 120.

The envelope 60 may include a dome as illustrated in FIG. 1F, enclosing a rigid frame 20 as illustrated in FIGS. 2A and 3A.

Preferably, envelope 60 is primarily composed of a transparent material. The transparent material preferably includes at least one glass-like material and/or transparent plastic. A glass-like material is a transparent material based upon fused silicates. A transparent plastic may preferably be primarily composed one or more polycarbonate based materials. Lexan is an example transparent polycarbonate based material.

Envelope 60 may preferably provide either ultraviolet transmission suppression and/or infra-red transmission suppression as well.

In FIG. 1F, envelope 60 may also include mounting infrastructure 50-52 supporting rigid frame 20 mounted at mounting angle 40 with respect to light tunnel 120.

The tracking system 30 may further, preferably position rigid frame 20 based upon at least local sidereal time.

Figure 4A:
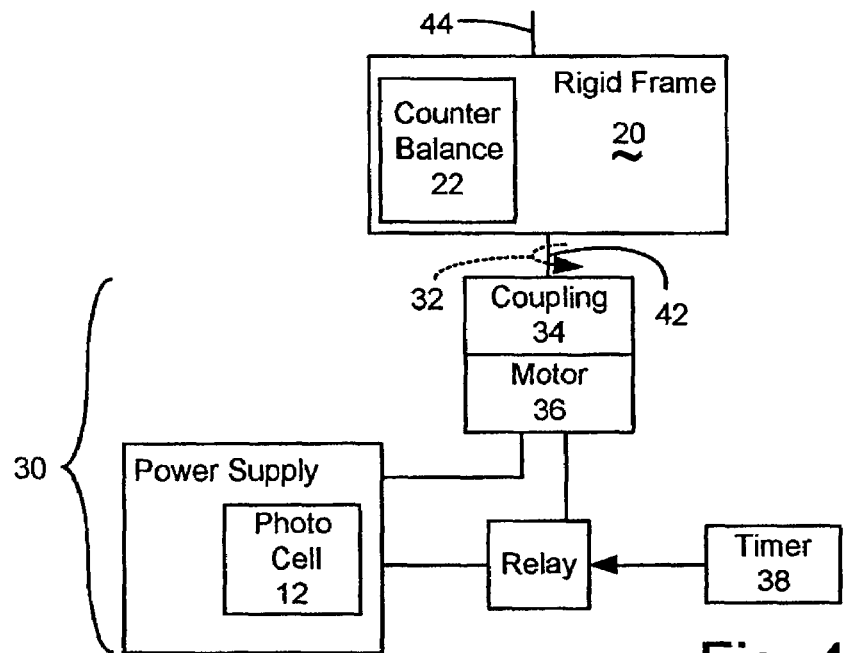
FIG. 4A illustrates a detail of FIGS. 1A-1C, and 1F, including rigid frame 20 with counterbalance 22 of FIGS. 1A and 1B, with one preferred embodiment of tracking system 30.

FIG. 4A illustrates a detail of FIGS. 1A-1C, and 1F, including rigid frame 20 with counterbalance 22 of FIGS. 1A and 1B, with one preferred embodiment of tracking system 30.

Figure 4B:
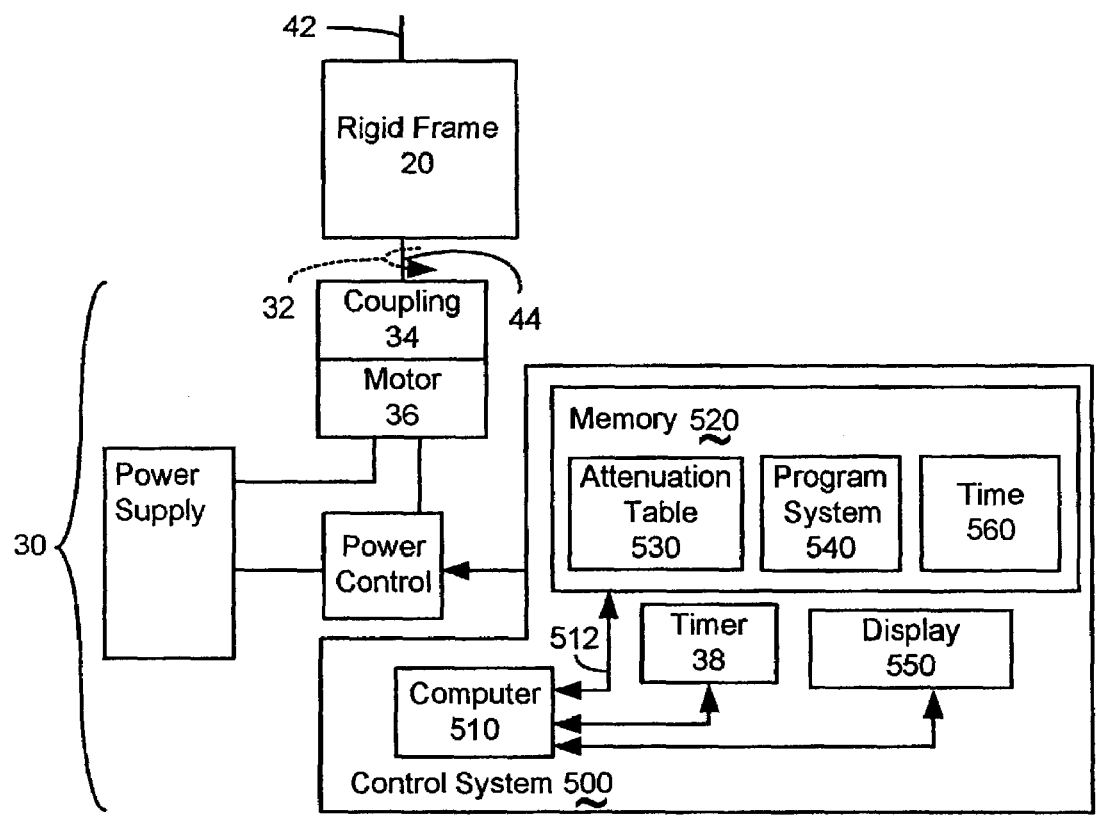
FIG. 4B illustrates a detail of FIGS. 1A-1C, and 1F, including rigid frame 20 with counterbalance 22 of FIGS. 1A and 1B, with an alternative embodiment of tracking system 30.

FIG. 4B illustrates a detail of FIGS. 1A-1C, and 1F, including rigid frame 20 with no counterbalance and with an alternative embodiment of tracking system 30.

In FIGS. 4A and 4B, tracking system 30 includes a coupling 34 for rotating 32 rigid frame 20 about the mounting angle 40 (seen in FIGS. 1A-1C, and 1F), through pivots 42 and 44. Electric motor 36 drives coupling 34 causing rigid frame 20 to rotate through frame angle 32 to create the rigid frame position as illustrated in FIGS. 2 and 3.

In FIG. 4A, the power supply, which may further include photocell 12 of FIG. 1B, powers electric motor 36, when the relay is closed. Timer 38 controls the closure of the relay.

In FIG. 4B, the operation of electric motor 36 is controlled by control system 500 through direction of the power control interfacing the power supply to the electric motor 36. The power control may preferably support bidirectional control of electric motor 36.

In FIG. 4B, control system 500 includes computer 510 accessibly coupled to memory 520. Memory 520 includes at least a program system 540 and at least one member of a time collection 560, which will be illustrated in FIG. 5B. Control system 500 also includes timer 38 communicating with computer 510.

Figure 5A:
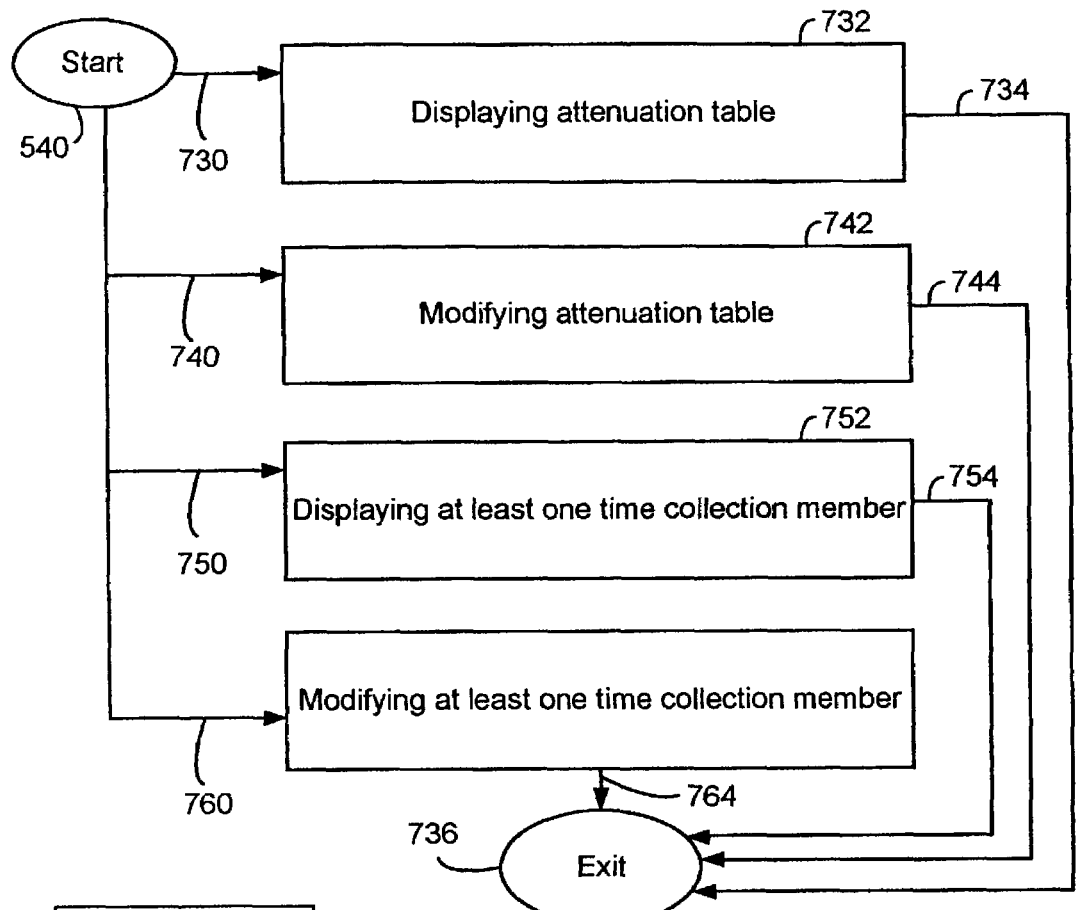
FIG. 5A illustrates a detail flowchart of program system 540 of FIG. 4B further providing a means for operating the invention.
Figure 5B:
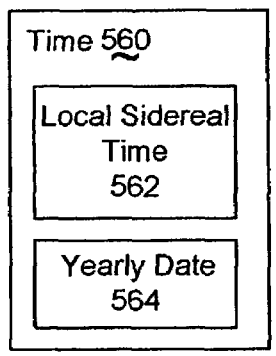
FIG. 5B illustrates the time collection 560 as having at least a local sidereal time 562 and a yearly date 564.
Figure 5C:
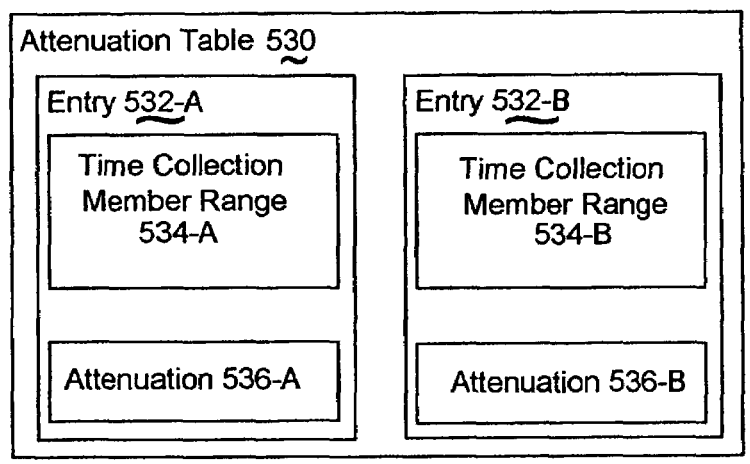
FIG. 5C illustrates the attenuation table 530 including a first entry 532-A and second entry 532-B. First entry 532-A includes a time collection member range 534-A and attenuation 536-A. Second entry 532-B includes a time collection member range 534-B and attenuation 536-B.

In FIG. 4B, memory 520 may further include an attenuation table containing at least two entries, each based upon at least one time collection member 560, as illustrated in FIG. 5C.

In FIG. 4B, control system 500 may further include a display 550.

FIG. 5A illustrates a detail flowchart of program system 540 of FIG. 4B further providing a means for operating the invention.

Operation 732 performs displaying the attenuation table 530. Operation 742 performs modifying the attenuation table 530. Operation 752 performs displaying at least one of the time collection members 560. Operation 762 performs modifying at least one of the time collection members 560.

The operations of FIG. 5A, stored in memory 520 and accessed by computer 510 direct the display and modification of at least one time collection member. Program system 540 may further include operations implementing the positioning of rigid frame 20.

FIG. 5B illustrates the time collection 560 as having at least a local sidereal time 562 and a yearly date 564.

FIG. 5C illustrates the attenuation table 530 including a first entry 532-A and second entry 532-B. First entry 532-A includes a time collection member range 534-A and attenuation 536-A. Second entry 532-B includes a time collection member range 534-B and attenuation 536-B.

The operations of FIG. 5A, stored in memory 520 and accessed by computer 510 direct the display and modification of the attenuation table entries, and may further implement the positioning of rigid frame 20.

In FIG. 5C, time collection member ranges 534-A and 534-B may include a range of either local sidereal time 562 or a range of local sidereal time 562 and a range of yearly dates 564, respectively.

In FIG. 5C, attenuations 536-A and 536-B may be members of a collection including attenuate-away-from light tunnel, and attenuate-into light tunnel.

An example of 534-B may include local sidereal time 562 between 10:00 AM and 4:00 PM, and a range of yearly dates 564 including the hottest days of the local year. Attenuation 536-B may be attenuate-away-from light tunnel. This attenuation entry would direct computer 510 to direct electric motor 36 to position rigid frame 20 to attenuate direct sun light away from the light tunnel.

The preceding embodiments have been provided by way of example and are not meant to constrain the scope of the following claims.

The invention claimed is:

1. A method of attenuating direct light from the sun at a location in the sky into a light tunnel in a sky light to create a direct sun light attenuation through said sky light and to create a sky view through said sky light, comprising the steps of:

viewing said sky through an array of N double-sided reflective panels mounted on a rigid frame at a mounting angle and through said light tunnel to create said sky view; and said double-sided reflective panel array interacting with said direct sunlight based upon said rigid frame position to create said direct sun light attenuation, further comprising the step of:

said double-sided reflective panel array reflectively directing said direct sunlight away from said light tunnel to create at least part of said direct sun light attenuation while said double-sided reflective panel array directs said sky into said light tunnel to create said sky view; and wherein said N is at least one.

2. The method of claim 1, wherein said N is at least three.

3. The method of claim 1, wherein the step of said double-sided reflective panel array interacting the said direct sunlight further comprises at least one member of the collection comprising the steps of:
said double-sided reflective panel array reflectively directing said direct sunlight into said light tunnel to create at least part of said direct sun light attenuation; and
said double-sided reflective panel array passing said direct sunlight into said light tunnel to create at least part of said direct sun light attenuation.

4. The method of claim 3, further comprising the step of:
positioning said rigid frame at a frame angle, with respect to said direct sun light, and with respect to pivoting at said mounting angle, to create a rigid frame position;
wherein the step of said double-sided reflective panel array reflectively directing said direct sunlight into said light tunnel is further comprised of the step of:
said double-sided reflective panel array reflectively directing said direct sunlight into said light tunnel based upon said rigid frame position to create said direct sun light attenuation;
wherein the step of said double-sided reflective panel array reflectively directing said direct sunlight away from said light tunnel is further comprised of the step of:
said double-sided reflective panel array reflectively directing said direct sunlight away from said light tunnel based upon said rigid frame position to create said direct sun light attenuation while said double-sided reflective panel array directs said sky into said light tunnel to create said sky view; and
wherein the step of said double-sided reflective panel array passing said direct sunlight into said light tunnel is further comprised of the step of:
said double-sided reflective panel array passing said direct sunlight into said light tunnel based upon said rigid frame position to create said direct sun light attenuation.

5. The method of claim 4, further comprising the step of:
providing power to support positioning said rigid frame at said frame angle.

6. The method of claim 5,
wherein the step providing said power is further comprised of the step of:
providing at least part of said power from a solar cell mounted upon at least one of said double-sided reflective panels.

7. The method of claim 4,
wherein the step positioning said rigid frame at said frame angle is further comprised of the step of:
positioning said rigid frame based upon at least one member of a time collection comprising a local sidereal time and a yearly date.

8. The method of claim 7,
wherein the step positioning said rigid frame at said frame angle is further comprised of the step of:
positioning said rigid frame based upon at least one of entry of an attenuation table for at least one of said time collection members.

9. The method of claim 8, further comprising a member of a collection comprising the steps of:
displaying said attenuation table;
modifying said attenuation table;
displaying at least one of said time collection members; and
modifying at least one of said time collection members.

10. The method of claim 7, further comprising the step of:
operating an electric motor based upon at least one of said time collection members to position said rigid frame at said frame angle to create said rigid frame position.

11. The method of claim 10,
wherein the step operating said electric motor is further comprised of the step of:
said electric motor rotating said rigid frame about said mounting angle to create said rigid frame position.

* * * * *